*Refrigerating Lid or Cover for Butter Kettles &c.*

*John Liming, assignor to himself and Charles C. Savery.*

116844

PATENTED JUL 11 1871

Witnesses:

Inventor:
John Liming

UNITED STATES PATENT OFFICE.

JOHN LIMING, OF PHILADELPHIA, PENNSYLVANIA, ASSIGNOR TO HIMSELF AND CHARLES C. SAVERY, OF SAME PLACE.

IMPROVEMENT IN BUTTER-KETTLES.

Specification forming part of Letters Patent No. 116,844, dated July 11, 1871.

*To all whom it may concern:*

Be it known that I, JOHN LIMING, of the city of Philadelphia, in the State of Pennsylvania, have invented certain Improvements in Butter-Kettles, of which the following is a specification:

My invention relates to the construction of the lids or covers of the well-known single-walled butter-kettles usually carried by hand in marketing, so as to afford within it an accessibly-covered chamber for storing fragments of ice; the object of my invention being to render the said kettle refrigerative in relation to its contents when used in hot weather for conveying print butter in marketing.

Figure 1:
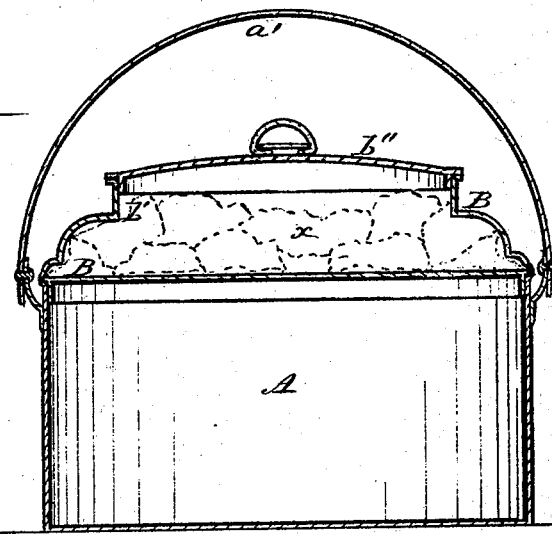
Figure 3:
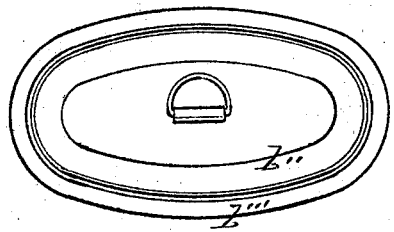
Figure 2:
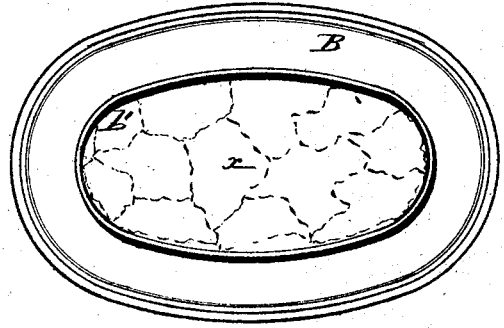

Figure 1 is a central vertical section of a butter-kettle embodying my invention. Fig. 2 is a plan view of the upper side of the lid or cover of the kettle without the special lid of the same. Fig. 3 is the special lid or cover, detached, of the ice-space in the lid or cover of the kettle.

The kettle A is an oval vessel of sheet metal, provided with a swinging bail, $a'$, substantially in the manner and form of those in common use for carrying butter from the markets, &c. The lid or cover B is a hollow sheet-metal case, having an opening, $b'$, through its convex upper side, which is provided with a closely-fitting flanched lid or cover, $b''$. The bottom of the lid or cover B is flat, and the surrounding edge is made to slip easily into the mouth of the kettle A until the usual surrounding flange $b'''$ above said edge rests upon the upper edge of the mouth of the kettle in the usual well-known manner.

The hollow space in the lid or cover B being filled with fragments of ice, (see dotted lines X X in Figs. 1 and 2,) and the lid $b''$ thereof inserted, (see Fig. 1,) the kettle A is ready for use; and it will be seen that articles placed therein, print butter especially, will be kept cool and perfect for a much longer time than is generally required for family marketing, that contact with the ice, which is not always to be had pure at short notice, will be avoided, and the whole space in the kettle left free for the article which is to be preserved therein.

I claim as my invention—

A butter-kettle, A, provided with a refrigerative lid or cover, B, constructed and applied to operate substantially as and for the purpose hereinbefore set forth.

JOHN LIMING.

Witnesses:
 BENJ. MORISON,
 WM. H. MORISON.